US006942598B2

(12) United States Patent
Kondo et al.

(10) Patent No.: US 6,942,598 B2

(45) Date of Patent: Sep. 13, 2005

(54) DRIVE CONTROL APPARATUS FOR A VEHICLE AND CONTROL METHOD THEREOF

(75) Inventors: Hiroki Kondo, Toyota (JP); Ryoji Habuchi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/636,742

(22) Filed: Aug. 8, 2003

(65) Prior Publication Data

US 2004/0043863 A1 Mar. 4, 2004

(30) Foreign Application Priority Data

Aug. 27, 2002 (JP) ....................................... 2002-247810

(51) Int. Cl.[7] ................................................ B60K 41/02

(52) U.S. Cl. ........................ 477/169; 477/175; 477/181

(58) Field of Search ................................. 477/168, 169, 477/174, 175, 177, 180, 181

(56) References Cited

U.S. PATENT DOCUMENTS

| | | | | | |
|---|---|---|---|---|---|
| 4,858,499 | A | * | 8/1989 | Ito et al. | 477/63 |
| 5,035,308 | A | * | 7/1991 | Baba et al. | 477/62 |
| 5,588,937 | A | * | 12/1996 | Kono et al. | 477/169 |
| 5,722,912 | A | * | 3/1998 | Narita | 477/64 |
| 6,231,480 | B1 | * | 5/2001 | Sasaki | 477/174 |

FOREIGN PATENT DOCUMENTS

| | | | | |
|---|---|---|---|---|
| DE | 695 23 468 T2 | | 5/2002 | |
| JP | 60-113861 | | 6/1985 | |
| JP | 63-203961 | | 8/1988 | |
| JP | 2-180368 | | 7/1990 | |
| JP | 04342620 | * | 11/1992 | 477/175 |
| JP | 6-47350 | | 6/1994 | |
| JP | 08210491 | * | 8/1996 | |
| JP | 8-326891 | | 12/1996 | |
| JP | 2001-200927 | | 7/2001 | |
| JP | 2001-330141 | | 11/2001 | |

* cited by examiner

*Primary Examiner*—Ha Ho

(74) *Attorney, Agent, or Firm*—Oblon, Spivak, McCleeland, Maier & Neustadt, P.C.

(57) ABSTRACT

A drive control apparatus for a vehicle including an engine which generates power using combustion of fuel; a hydrodynamic power transmission device which transmits an output of the engine via fluid, includes an input side and an output side which can be directly coupled; a lock-up engagement device which engages the lock-up clutch when a predetermined lock-up engagement condition is satisfied; and a lock-up restriction device which stops engagement control performed by the lock-up engagement device so as to disengage the lock-up clutch if there is a possibility that knocking will occur in the engine when the lock-up clutch is engaged by the lock-up engagement device. A shock at the time of tip-in acceleration is suppressed irrespective of knocking prevention control so as to improve riding comfort. In addition, occurrence of a droning noise is suppressed.

10 Claims, 9 Drawing Sheets

DRIVE CONTROL APPARATUS FOR A VEHICLE AND CONTROL METHOD THEREOF

The disclosure of Japanese Patent Application No. 2002-247810 filed on Aug. 27, 2002, including the specification, drawings and abstract is incorporated herein by reference in its entirety.

BACKGROUND OF THE INVENTION

1. Field of the Invention

The invention relates to a drive control apparatus for a vehicle and a control method thereof, and more particularly to a control of a lock-up clutch.

2. Description of the Related Art

A drive control apparatus for a vehicle is known, which includes (a) an engine which generates power using combustion of fuel; (b) an automatic transmission which can automatically change a gear ratio; (c) a hydrodynamic power transmission device which transmits an output of the engine to the automatic transmission via fluid, and in which an input side and an output side can be directly coupled using a lock-up clutch; (d) a fuel cut device which stops fuel supply to the engine when a vehicle is coasting with a throttle valve of the engine being fully closed, and a predetermined fuel cut condition is satisfied; and (e) a lock-up engagement device which engages the lock-up clutch when a predetermined lock-up engagement condition is satisfied. An example of such a drive control apparatus for a vehicle is disclosed in Japanese Patent Laid-Open Publication No. 9-53718. In the drive control apparatus for a vehicle, a lock-up clutch is engaged when a vehicle is coasting, which increases an engine rotational speed and enlarges a fuel cut region (a vehicle speed range), thereby improving fuel efficiency.

In such a drive control apparatus for a vehicle, when fuel supply is restarted from a fuel cut state according to a driver's accelerator operation (a driver's output request) and an engine output is increased, an operating state of the engine is changed from an engine brake state to a driving state. Therefore, a shock may occur due to a change in a driving force of the engine. In the case where such a shock occurs when an amount of accelerator operation is relatively small and tip-in acceleration which is gradual acceleration is performed, riding comfort may become poor and the driver may feel uncomfortable.

In order to solve the problem, it is possible to perform a smoothing processing for smoothing a change in the engine output, and further a change in the driving force, by performing control for delaying ignition timing of the engine or the like. However, in a region where there is a possibility that knocking will occur at a relatively low vehicle speed, the smoothing processing is restricted by knocking prevention control, i.e., engine control for preventing knocking, which makes it difficult to fully prevent a shock. Particularly, in the case of an engine in which a knocking limit is low, it is extremely difficult to perform both the smoothing processing for preventing a shock and the knocking prevention control.

Meanwhile, a droning noise may occur at a preset engine rotational speed region due to resonance between vibration of a driving system such as the engine and a vehicle body. In such a droning noise occurrence region, occurrence of a droning noise is suppressed by disengaging the lock-up clutch, or by correcting a shift map (a shift condition) for the automatic transmission such that the engine rotational speed does not constantly remain in the droning noise occurrence region. However, when the lock-up clutch is disengaged, fuel efficiency deteriorates due to transmission loss in the hydrodynamic power transmission device. When the shift map is corrected, fuel efficiency and running performance may deteriorate.

SUMMARY OF THE INVENTION

In view of the above circumstances, the invention is made. According to an exemplary embodiment of the invention, there is provided a drive control apparatus for a vehicle, which includes an engine which generates power using combustion of fuel; a hydrodynamic power transmission device which transmits an output of the engine via fluid, and in which an input side and an output side can be directly coupled using a lock-up clutch; a lock-up engagement device which engages the lock-up clutch when a predetermined lock-up engagement condition is satisfied; and a lock-up restriction device which stops engagement control performed by the lock-up engagement device so as to disengage the lock-up clutch if there is a possibility that knocking will occur in the engine when the lock-up clutch is engaged by the lock-up engagement device.

Also, according to another aspect of the invention, there is provided a control method of a drive control apparatus for a vehicle, which includes an engine which generates power using combustion of fuel; a hydrodynamic power transmission device which transmits an output of the engine via fluid, and in which an input side and an output side can be directly coupled by using the lock-up clutch; and a lock-up engagement device which engages the lock-up clutch when a predetermined lock-up engagement condition is satisfied. In the control method, engagement control performed by the lock-up engagement device is stopped so as to disengage the lock-up clutch if there is a possibility that knocking will occur in the engine when the lock-up clutch is engaged by the lock-up engagement device.

According to the aforementioned drive control device for a vehicle and the control method thereof, if there is a possibility that knocking will occur in the engine when the lock-up clutch is engaged by the lock-up engagement device, the engagement control performed by the lock-up engagement device is stopped so as to disengage the lock-up clutch, and power is transmitted via the hydrodynamic power transmission device. Therefore, there is no possibility that a shock will occur at the time of tip-in acceleration, or the like. In the case where the knocking prevention control is preferentially performed when the smoothing processing for the engine is required, for example, at the time of tip-in acceleration, the smoothing processing is not appropriately performed. Even in such a case, since power transmission is smoothed by the hydrodynamic power transmission device, there is no possibility that a shock will occur. Also, when the lock-up clutch is disengaged in this manner, a change in the engine rotational speed is permitted to a certain extent. Therefore, occurrence of knocking is suppressed by the change in the engine rotational speed.

According to a further aspect of the invention, there is provided a drive control apparatus for a vehicle, which includes an engine which generates power using combustion of fuel; an automatic transmission which can automatically change a gear ratio; a hydrodynamic power transmission device which transmits an output of the engine to the automatic transmission via fluid, and in which an input side and an output side can be directly coupled using a lock-up clutch; a lock-up engagement device which engages the lock-up clutch when a predetermined lock-up engagement condition is satisfied; and a droning noise suppression device which temporarily stops engagement control performed by the lock-up engagement device so as to disengage the lock-up clutch in the case where an engine rotational speed enters a preset droning noise occurrence region when the lock-up clutch is engaged by the lock-up engagement device, and which causes the automatic transmission to perform shifting such that an engine rotational speed exits from the droning noise occurrence region when the lock-up clutch is reengaged, and then reengages the lock-up clutch.

According to a further aspect of the invention, there is provided a control method of a drive control apparatus for a vehicle, which includes an engine which generates power using combustion of fuel; an automatic transmission which can automatically change a gear ratio; a hydrodynamic power transmission device which transmits an output of the engine to the automatic transmission via fluid, and in which an input side and an output side can be directly coupled using a lock-up clutch; and a lock-up engagement device which engages the lock-up clutch when a predetermined lock-up engagement condition is satisfied. The control method includes the following steps of: temporarily stopping engagement control performed by the lock-up engagement device so as to disengage the lock-up clutch in the case where an engine rotational speed enters a preset droning noise occurrence region when the lock-up clutch is engaged by the lock-up engagement device; and causing the transmission to perform shifting such that the engine rotational speed exits from the droning noise occurrence region when the lock-up clutch is reengaged, and then, reengaging the lock-up clutch.

According to the aforementioned drive control apparatus for a vehicle and the control method thereof, in the case where the engine rotational speed enters the preset droning noise occurrence region when the lock-up clutch is engaged by the lock-up engagement device, the engagement control performed by the lock-up engagement device is temporarily stopped so as to disengage the lock-up clutch. Therefore, the engine and the driving system that are sources of vibration are separated, which reduces a droning noise. Also, in addition to disengagement of the lock-up clutch, the automatic transmission is caused to perform shifting such that the engine rotational speed, that is, rotational speed of an input shaft of the automatic transmission at the time of reengagement of the lock-up clutch, exits from the droning noise occurrence region, and then the lock-up clutch is reengaged. Therefore, it is possible to set a lock-up clutch engagement region in which the lock-up clutch is engaged and a shift map (a shift condition) without considering a droning noise. Accordingly, it is possible to enlarge the lock-up clutch engagement region so as to further improve fuel efficiency. In addition, it is possible to improve fuel efficiency and running performance using appropriate shift control.

A change in the engine rotational speed is permitted by disengagement of the lock-up clutch. Therefore, when the throttle valve is controlled to be opened, for example, when acceleration is required, the engine rotational speed quickly exits from the droning noise occurrence region independently of shifting by the automatic transmission, which quickly prevents occurrence of a droning noise. Also, when the droning noise occurrence region is set so as to be larger than a region where a droning noise actually occurs, it is possible to prevent actual occurrence of a droning noise.

The droning noise suppression control described above is effective when the engine rotational speed transitionally enters the droning noise occurrence region due to an accelerator operation or the like. The engine rotational speed may constantly remain in the droning noise occurrence region according to a normal shift condition (a shift map or the like). More specifically, even if the droning noise suppression device performs shifting and changes the engine rotational speed, the engine rotational speed may reenter the droning noise occurrence region according to the normal shift condition. In such a case, the lock-up clutch may be maintained in the disengaged state without performing shifting. In other words, according to the invention, the lock-up clutch engagement region is enlarged, and the lock-up clutch is disengaged only when the engine rotational speed enters the droning noise occurrence region, while in the conventional case, a lock-up clutch disengagement region is set such that the lock-up clutch is disengaged even when the engine rotational speed transitionally enters the droning noise occurrence region.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description and the accompanying drawings, the present invention will be described in more detail in terms of exemplary embodiments.

Hereinafter embodiments of the invention will be described with reference to the accompanying drawings.

Figure 1:
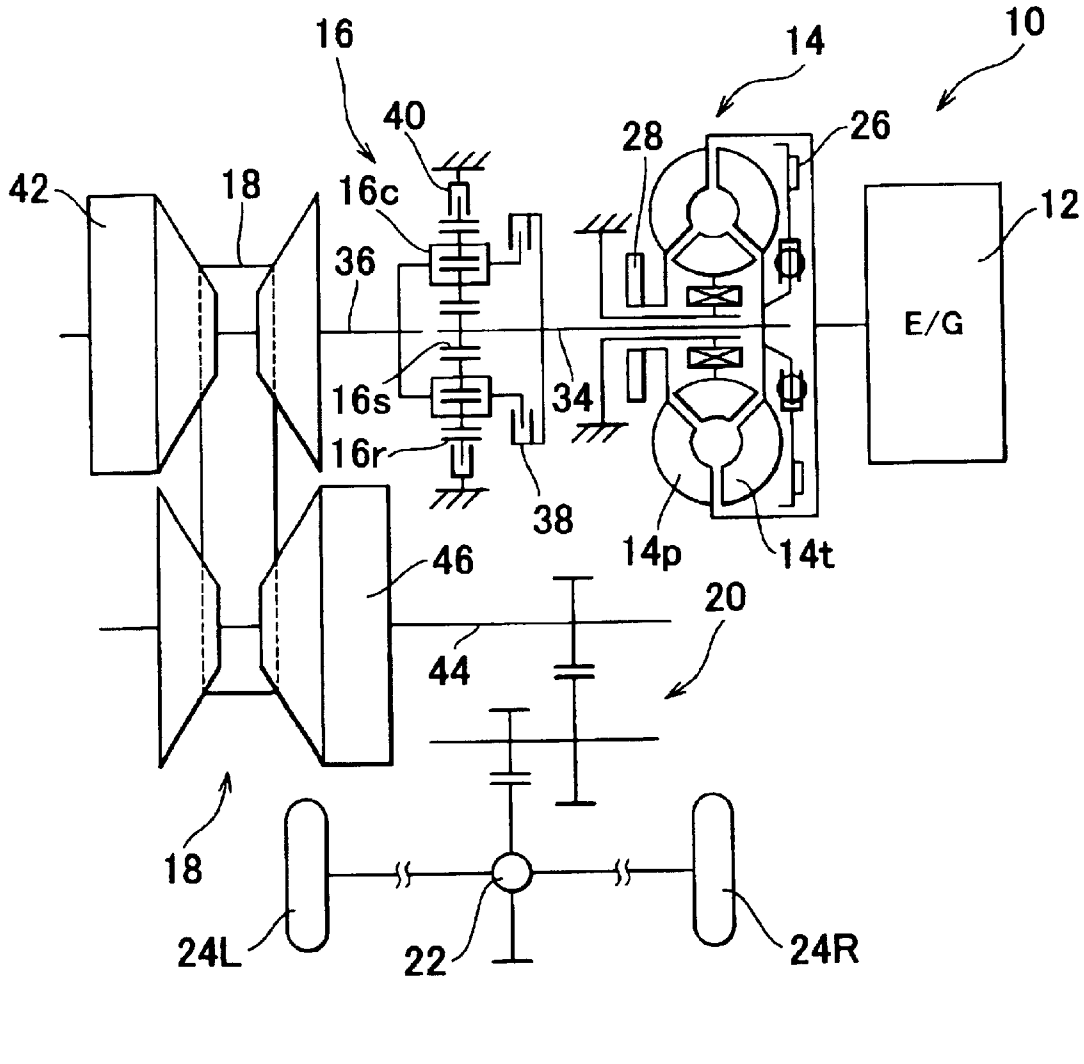
FIG. 1 is a schematic diagram showing a drive apparatus for a vehicle to which the invention is applied.

FIG. 1 is a schematic diagram showing a drive apparatus for a vehicle 10 to which the invention is applied. The drive apparatus for a vehicle 10 is of horizontally mounted type, and is suitably employed in a front engine front drive type vehicle. The drive apparatus for a vehicle 10 includes an engine 12 as a source of a driving force for running. An output of the engine 12, which is composed of an internal combustion engine, is transmitted to a torque converter 14 as a hydrodynamic power transmission device. Then, the output is transmitted to a differential gear device 22 via a forward-backward switching device 16, a belt type continuously variable transmission (CVT) 18, and a speed reduction gear 20. Then, the output is distributed to right and left driving wheels 24L, 24R.

The torque converter 14 includes a pump impeller 14*p* connected to a crankshaft of the engine 12, and a turbine runner 14*t* connected to the forward-backward switching device 16 via a turbine shaft 34. The torque converter 14 transmits power via fluid. A lock-up clutch 26 is provided between the pump impeller 14*p* and the turbine runner 14*t*. The lock-up clutch 26 is engaged or disengaged when hydraulic pressure is supplied to an engagement side oil chamber or a disengagement side oil chamber according to control of a lock-up control device 90 (refer to FIG. 2). When the lock-up clutch 26 is completely engaged, the pump impeller 14*p* and the turbine runner 14*t* are integrally rotated. A mechanical oil pump 28 is provided in the pump impeller 14*p*. The mechanical oil pump 28 generates hydraulic pressure which is used for performing control of shifting of the continuously variable transmission 18, generating the belt pressing force, or supplying a lubricant to each portion.

The forward-backward switching device 16 is composed of a double pinion type planetary gear device. A turbine shaft 34 of the torque converter 14 is connected to a sun gear 16*s*, and an input shaft 36 of the continuously variable transmission 18 is connected to a carrier 16*c*. When the forward clutch 38, which is provided between the carrier 16*c* and the sun gear 16*s*, is engaged, the forward-backward switching device 16 is integrally rotated, the turbine 34 is directly coupled to the input shaft 36, and a driving force in a forward direction is transmitted to the driving wheels 24R, 24L. Also, a backward brake 40, which is provided between a ring gear 16*r* and a housing, is engaged and the forward clutch 38 is disengaged, the input shaft 36 is rotated in a reverse direction with respect to the rotation of the turbine shaft 34, and a driving force in a backward direction is transmitted to the driving wheels 24R, 24L.

The continuously variable transmission 18 includes an input side variable pulley 42 which is provided on the input shaft 36 and whose effective diameter is variable; an output side variable pulley 46 which is provided on an output shaft 44, and whose effective diameter is variable; and a transmission belt 48 wound around the variable pulleys 42, 46. Power is transmitted via a frictional force between the variable pulleys 42, 46 and the transmission belt 28. In each of the variable pulleys 42, 46, a width of a V-shaped groove is variable. Each of the variable pulleys 42, 46 is configured so as to include a hydraulic cylinder. When hydraulic pressure of the hydraulic cylinder of the input side variable pulley 42 is controlled by a shift control device 86 (refer to FIG. 2), the width of the V-shaped groove of each of the variable pulleys 42, 46 is changed, the effective diameter of the transmission belt 48 is changed, and a gear ratio γ (=the input shaft rotational speed NIN/an output shaft rotational speed NOUT) is continuously changed.

Meanwhile, hydraulic pressure of the hydraulic cylinder of the output side variable pulley 46 is controlled to be adjusted by a pressing force control device 88 (refer to FIG. 2) so that the transmission belt 48 does not slip. The pressing force control device 88 is configured so as to include a linear solenoid valve which is duty-controlled by an electronic control unit 60. When the hydraulic pressure of the hydraulic cylinder of the output side variable pulley 46 is continuously controlled by the linear solenoid valve, the belt pressing force, i.e., the frictional force between the variable pulleys 42, 46 and the transmission belt 48 is increased or decreased.

Figure 2:
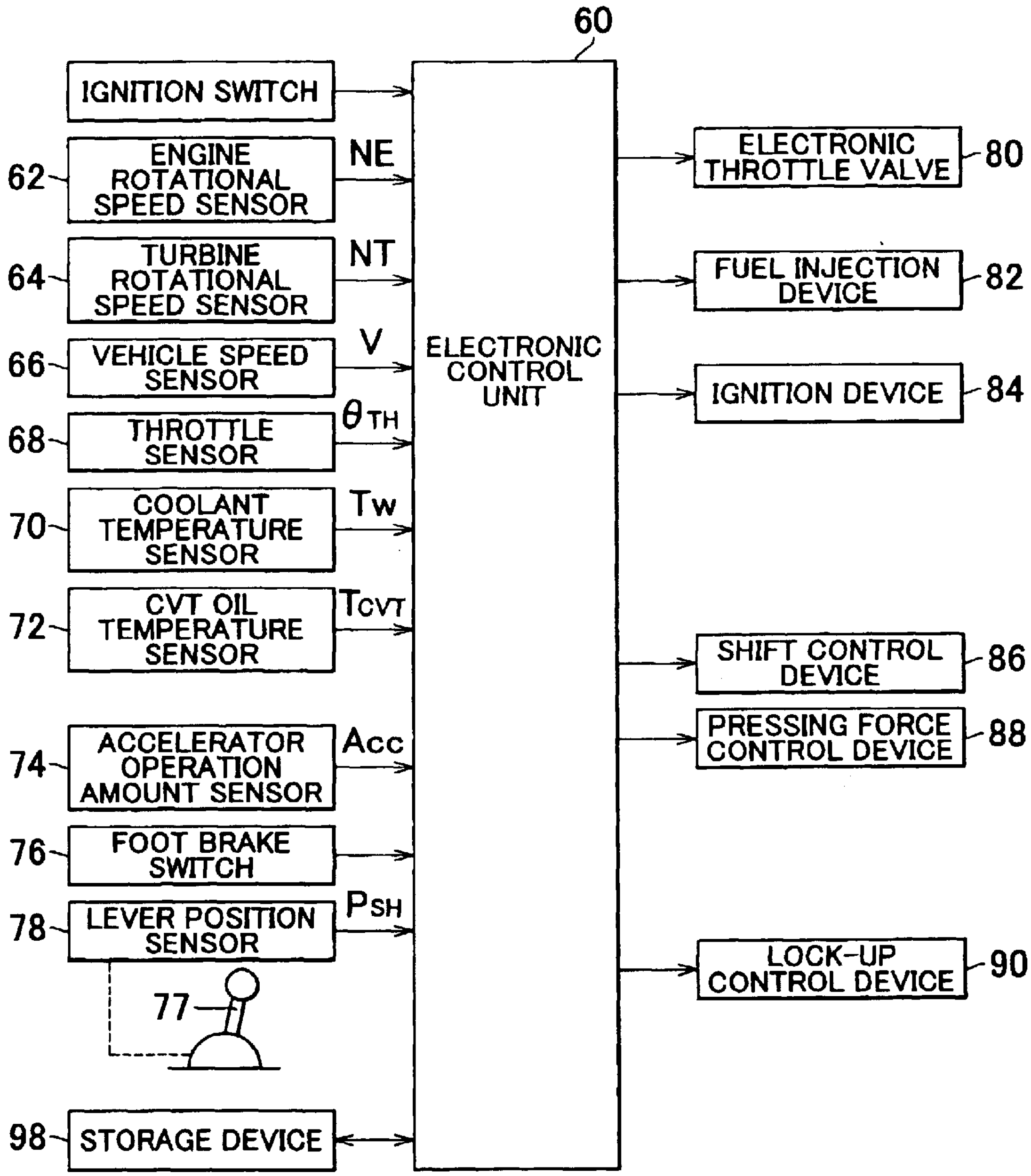
FIG. 2 is a block diagram describing a control system of the drive apparatus for a vehicle shown in FIG. 1.

FIG. 2 is a block diagram describing a control system which is provided in a vehicle so as to control the engine 12 and the continuously variable transmission 18 in FIG. 1, and the like. An engine rotational speed sensor 62, a turbine rotational speed sensor 64, a vehicle speed sensor 66, a throttle sensor with an idle switch 68, a coolant temperature sensor 70, a CVT oil temperature sensor 72, an accelerator operation sensor 74, a foot brake switch 76, a lever position sensor 78, and the like, are connected to the electronic control unit 60. The electronic control unit 60 is supplied with signals indicating a rotational speed of the engine 12 (an engine rotational speed) NE, a rotational speed of the turbine shaft 34 (a turbine rotational speed) NT, a vehicle speed V, an opening of an electronic throttle valve 80 (a throttle valve opening) $\theta_{TH}$, a coolant temperature $T_W$ of the engine 12, an oil temperature $T_{CVT}$ of hydraulic circuits of the continuously variable transmission 18 and the like, an operation amount of an accelerator operating member such as an accelerator pedal (an accelerator operation amount) $A_{CC}$, a lever position (an operation position) $P_{SH}$ of a shift lever 77, and the like, and a signal indicating whether or not a foot brake, which is a service brake, is operated. The turbine rotational speed NT matches the rotational speed of the input shaft 36 (The input shaft rotational speed) NIN when the vehicle is running forward with the forward clutch 38 being engaged. The vehicle speed V corresponds to the rotational speed of the output shaft 44 (the output shaft rotational speed) NOUT of the continuously variable transmission 18. Also, the accelerator operation amount $A_{CC}$ indicates an amount of output required by the driver.

The electronic control unit 60 is configured so as to include a so-called microcomputer which includes CPU, RAM, ROM, an input/output interface, and the like. The CPU performs signal processing using a temporary memory function of the RAM, according to a program that is stored in the ROM in advance, thereby performing control of the output of the engine 12, control of shifting of the continuously variable transmission 18, control of the pressing force, control of engagement and disengagement of the lock-up clutch 26, and the like. If necessary, CPU for engine control and CPU for shift control are separately configured. The control of the output of the engine 12 is performed by the electronic throttle valve 80, a fuel injection device 82, an ignition device 84, and the like. The control of shifting of the continuously variable transmission 18 is performed by the shift control device 86, and the control of the pressing force is performed by the pressing force control device 88. Also, the control of engagement and disengagement of the lock-up clutch 26 is performed by the lock-up control device 90. Each of the shift control device 86, the pressing force control device 88, and the lock-up control device 90 is configured so as to include a solenoid valve which is excited by the electronic control unit 60 so as to open and close an oil passage; a linear solenoid valve which is excited by the electronic control unit 60 so as to perform control of hydraulic pressure; an opening/closing valve which opens and closes the oil passage according to a signal pressure output from the solenoid valve; a switching valve which switches between the oil passages according to a signal pressure output from the linear solenoid valve, and the like. The state of each of the clutch 38 and the brake 40 of the forward-backward switching device 16 is switched between the engagement state and disengagement state when switching between hydraulic pressure circuits is mechanically performed by, for example, a manual valve connected to a shift lever 77. However, switching between the engagement state and the disengagement state of each of the clutch 38 and the brake 40 may be electrically performed by the electronic control unit 60.

Figure 3:
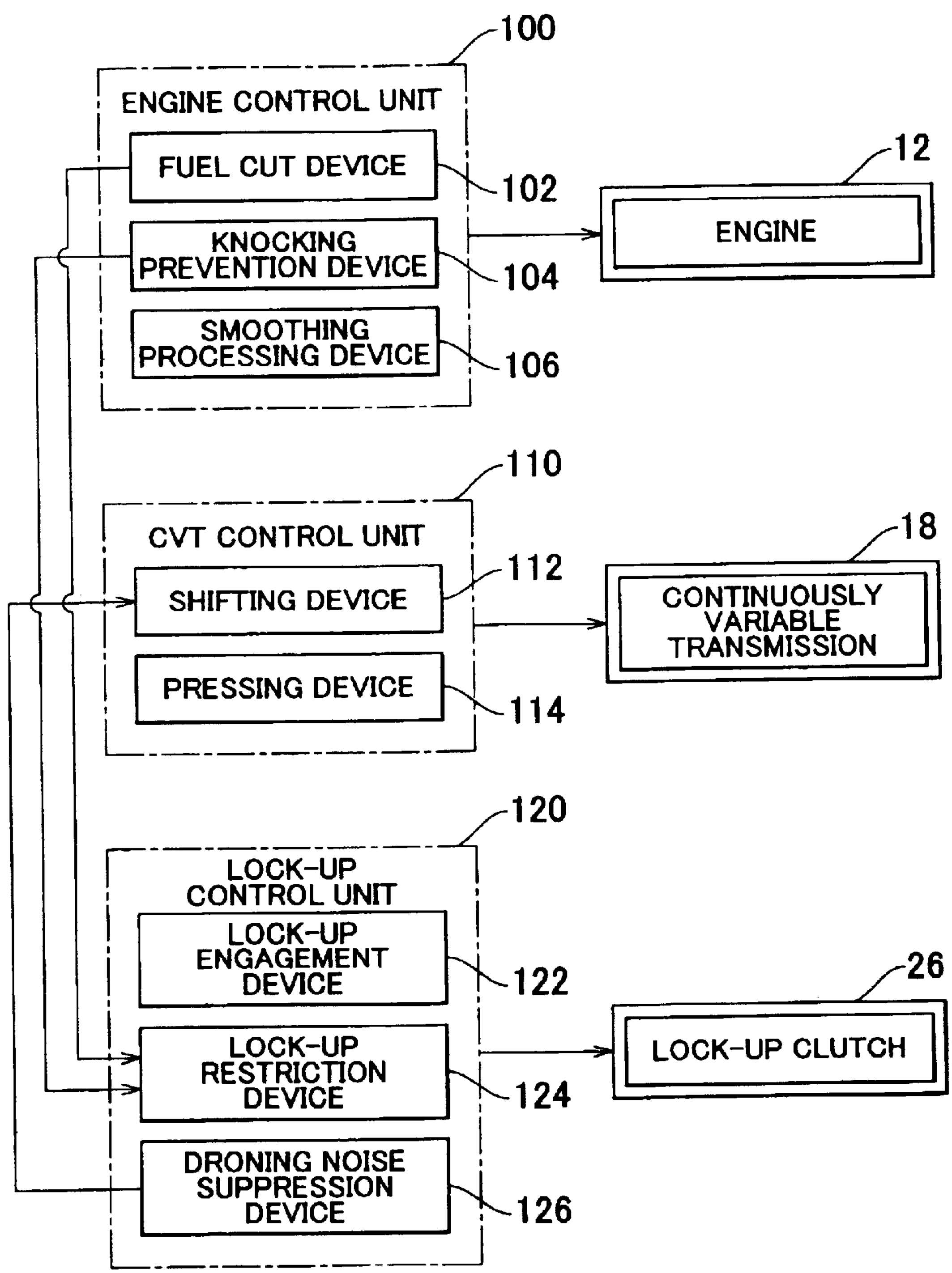
FIG. 3 is a block diagram describing main functions of an electronic control unit shown in FIG. 2.

FIG. 3 is a block diagram describing functions which are performed when the electronic control unit 60 performs signal processing. The electronic control unit 60 functionally includes an engine control unit 100, a CVT control unit 110, and a lock-up control unit 120.

Basically, the engine control unit 100 controls the output of the engine 12. The engine control unit 100 controls the electronic throttle valve 80 so as to be opened and closed, controls the fuel injection device 82 for controlling a fuel injection amount, and controls the ignition device 84 such as an ignitor for controlling ignition timing. The electronic throttle valve 80 is controlled so as to be opened and closed according to a map which is preset using the accelerator operation amount $A_{CC}$ as a parameter. As the accelerator operation amount $A_{CC}$ increases, the throttle valve opening $\theta_{TH}$ increases.

Also, the engine control unit 100 includes a fuel cut device 102, a knocking prevention device 104, and a smoothing processing device 106. The fuel cut device 102 stops fuel supply performed by the fuel injection device 82 so as to improve fuel efficiency when the vehicle is coasting with the throttle valve being fully closed, and a predetermined fuel cut condition is satisfied. The fuel cut condition is set so as to include a condition that the engine rotational speed NE is equal to or higher than a predetermined value, the condition that the coolant temperature $T_W$ of the engine 12 is equal to or higher than a predetermined value, and the like so that the engine 12 can be started (i.e., the crankshaft can rotate independently) immediately when fuel supply is restarted.

Figure 8:
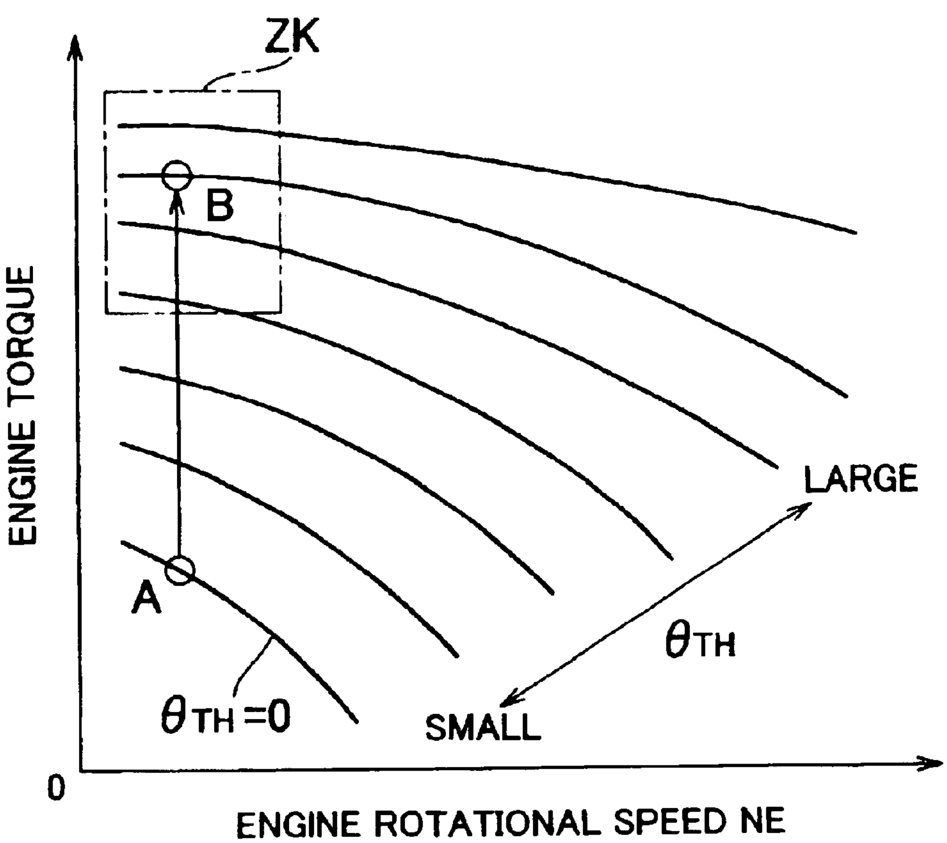
FIG. 8 is a diagram specifically describing a knocking prevention region ZK in which knocking prevention control is performed by a knocking prevention device shown in FIG. 3.

The knocking prevention device 104 performs control for delaying the timing of ignition performed by the ignition device 84 in order to suppress occurrence of knocking when the operating state of the engine 12 is in a preset knocking prevention region ZK. The knocking prevention region ZK is an operation region in which knocking is likely to occur in the engine 12. For example, as shown in FIG. 8, the knocking prevention region ZK is preset through experiments using the engine rotational speed NE and the throttle valve opening $\theta_{TH}$ as parameters. In the embodiment, the knocking prevention region ZK is set to be a region in which the engine rotational speed NE is low (for example, approximately 1000 rpm) and the throttle valve opening $\theta_{TH}$ is intermediate opening to high opening. The knocking prevention region ZK is stored in a storage device 98 (refer to FIG. 2) in advance.

Also, the smoothing processing device 106 smoothes a change in the driving force so as to reduce a shock, by performing control for delaying the timing of ignition performed by the ignition device 84, at the time of acceleration when the operating state of the engine is changed from the engine brake state to the driving state, for example, at the time of tip-in acceleration when the accelerator pedal is depressed and acceleration starts after the vehicle has been coasting with the electronic throttle valve 80 being substantially filly closed. In other words, in the smoothing processing, riding comfort takes precedence over acceleration performance. For example, the smoothing processing may be prohibited when the throttle valve opening $\theta_{TH}$ or the accelerator operation amount $A_{CC}$ is equal to or higher than a predetermined value, or a rate of change in the throttle valve opening $\theta_{TH}$ or the acceleration operation amount $A_{CC}$ is equal to or higher than a predetermined value, and there is a strong driver's request for acceleration. In addition, in the case where the smoothing processing is performed when the control for delaying the ignition timing is performed by the knocking prevention device 104, the control by the knocking prevention device 104 takes precedence over the smoothing processing. Also, since the change in the driving force is smoothed by the action of fluid of the torque converter 14 when the lock-up clutch 26 is disengaged, the smoothing processing device 106 is not necessarily required to perform the smoothing processing, and the smoothing processing may be performed on the condition that the lock-up clutch 26 is engaged.

Figure 4:
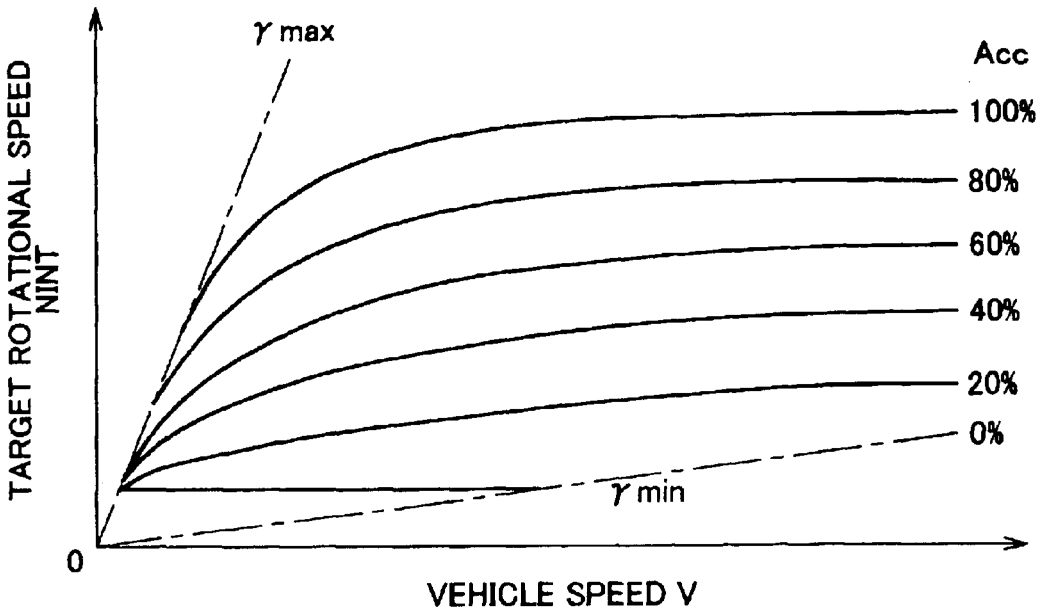
FIG. 4 is a diagram showing an example of a shift map which is used for determining a target rotational speed NINT in shift control that is performed by a shifting device shown in FIG. 3.

The CVT control unit 110 in FIG. 3 includes a shifting device 112 and a pressing device 114. The shifting device 112 calculates the target rotational speed NINT on the input side, based on the shift map which is preset using the accelerator operation amount $A_{CC}$ indicating the amount of output required by the drivers and the vehicle speed V as parameters, as shown in FIG. 4. Then, the shifting device 112 controls shifting of the continuously variable transmission 18 so that the actual input shaft rotational speed NIN matches the target rotational speed NINT, according to the deviation therebetween. More specifically, supply and discharge of hydraulic oil to and from the hydraulic cylinder of the input side variable pulley 42 is controlled, by performing feedback control of the solenoid valve of the shift control device 86, or the like. A map in FIG. 4 shows a shift condition. In the map, the target rotational speed NINT is set such that as the vehicle speed V is smaller and the accelerator operation amount $A_{CC}$ is larger, the gear ratio $\gamma$ is larger. Also, the vehicle speed V corresponds to the output shaft rotational speed NOUT. Therefore, the target rotational speed NINT, which is a target value of the input shaft rotational speed NIN, corresponds to the target gear ratio. The shift map is set in a range of a minimum gear ratio $\gamma min$ to a maximum gear ratio $\gamma max$, and is stored in the storage device 98 in advance.

Figure 5:
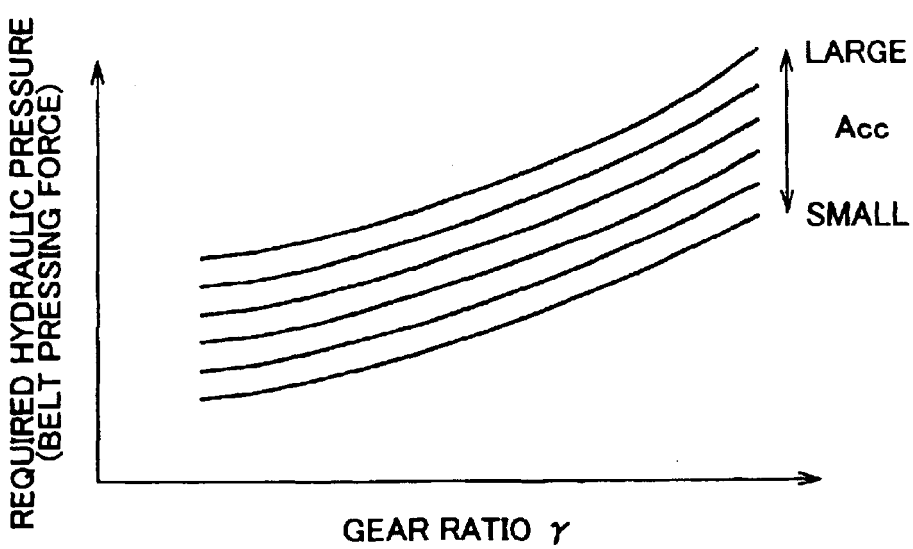
FIG. 5 is a diagram showing an example of required hydraulic pressure which is used for determining required hydraulic pressure in the belt pressing force control that is performed by a pressing device shown in FIG. 8.

The pressing device 114 controls the pressing force of the continuously variable transmission 18, according to, for example, a map showing required hydraulic pressure (equivalent to a belt pressing force) in FIG. 5. The map showing required hydraulic pressure is preset using the accelerator operation amount $A_{CC}$ corresponding to transmission torque and the gear ratio $\gamma$ as parameters so that belt slipping does not occur. More particularly, the pressing device 114 controls and adjusts hydraulic pressure of the hydraulic cylinder of the output side variable pulley 46, which corresponds to the belt pressing force of the continuously variable transmission 18, by performing control of exciting current for the linear solenoid valve of the pressing force control device 88, or the like. The map showing required hydraulic pressure in FIG. 5 is stored in the storage device 98 in advance, as well as the aforementioned shift map.

Figure 6:
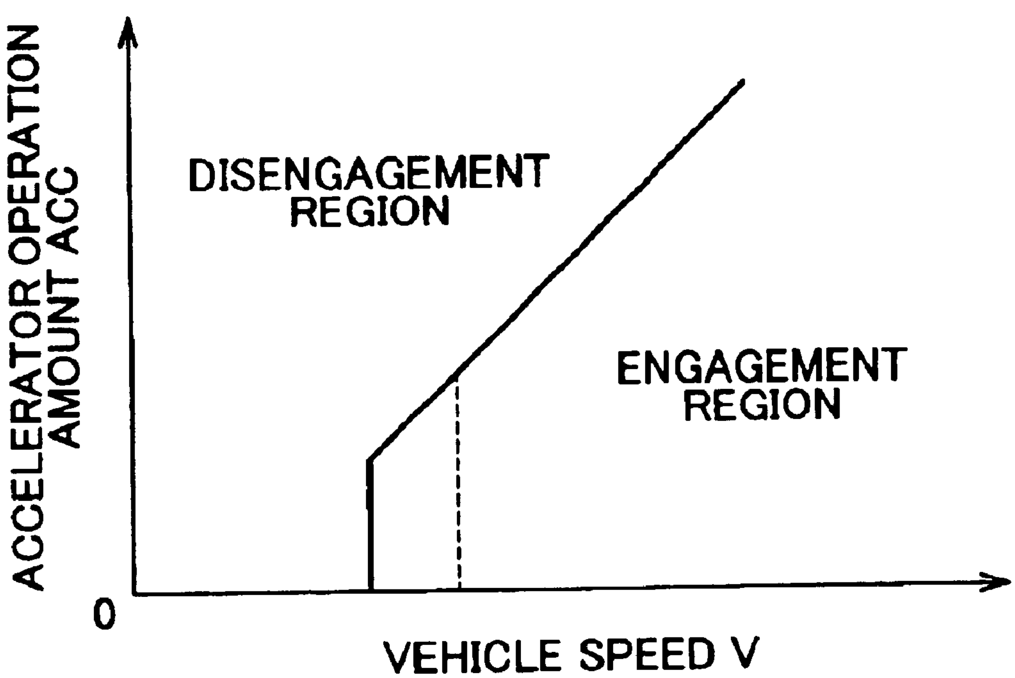
FIG. 6 is a diagram showing an example of a lock-up map which is used when a lock-up clutch is engaged and disengaged by the lock-up engagement device shown in FIG. 3.

A lock-up control unit 120 in FIG. 3 includes a lock-up engagement device 122, a lock-up restriction device 124, and a droning noise suppression device 126. The lock-up control unit 120 engages or disengages the lock-up clutch 26 using the lock-up control device 90 according to, for example, a lock-up map in FIG. 6 which is preset using the vehicle speed V and the accelerator operation amount $A_{CC}$ as parameters. The lock-up map in FIG. 6 shows a lock-up engagement condition. For example, the lock-up map is set so that the lock-up clutch 26 is disengaged in a region in which the vehicle speed V is low and the accelerator operation amount $A_{CC}$ is large, considering vibration due to torque fluctuation of the engine 12 and fuel efficiency. The lock-up map is stored in the storage device 98 in advance.

If the knocking prevention device 104 performs control for delaying the ignition timing in the case where the electronic throttle valve 80 is opened and fuel supply to the engine 12 is restarted when the lock-up clutch 26 is engaged by the lock-up engagement device 122, after the fuel supply has been stopped by the fuel cut device 102, the lock-up restriction device 124 stops engagement control performed by the lock-up engagement device 122 so as to disengage the lock-up clutch 26. When the vehicle is running forward, the lock-up restriction device 124 performs signal processing according to a flowchart in FIG. 7.

Figure 7:
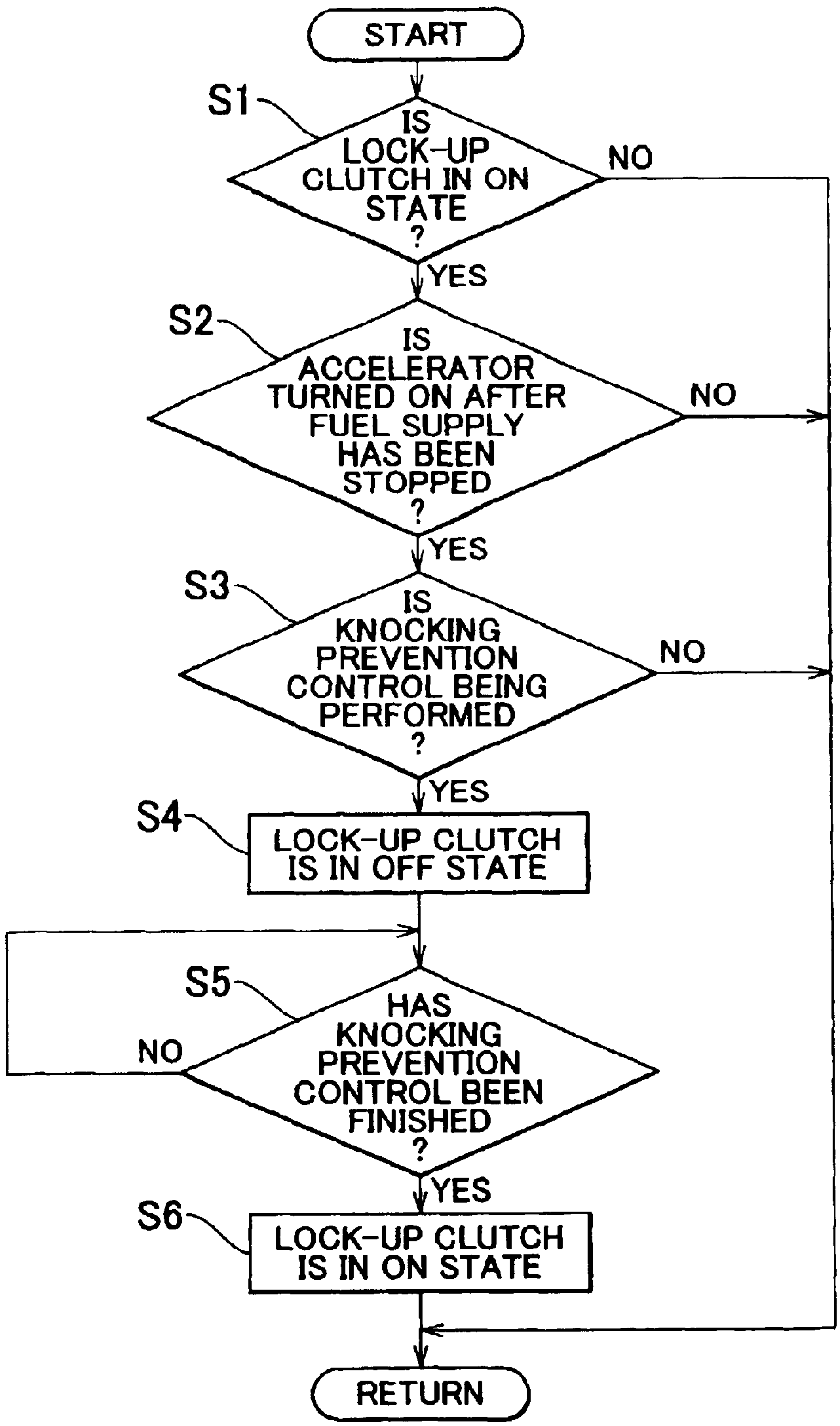
FIG. 7 is a flowchart specifically describing processing performed by a lock-up restriction device shown in FIG. 3.

In step S1 in FIG. 7, it is determined whether or not the lock-up clutch 26 is engaged by the lock-up engagement device 122 (the lock-up clutch is in an ON state). When the lock-up clutch is in the ON state, step S2 is performed. In step S2, it is determined whether or not the accelerator is operated (the accelerator is turned ON) after fuel supply has been stopped by the fuel cut device 102 so that fuel supply is restarted and the electronic throttle valve 80 is controlled to be opened. When the accelerator is turned ON after fuel supply has been stopped, step S3 is performed. In step S3, it is determined whether or not the knocking prevention control is being performed by the knocking prevention device 104, more specifically, the control for delaying the ignition timing of the engine 12 is being performed. When the knocking prevention control is being performed, the engagement control performed by the lock-up engagement device 122 is stopped so as to disengage the lock-up clutch 26 in step S4. FIG. 8 shows a case where the accelerator is depressed in the fuel cut state, i.e., the state in which the accelerator is OFF, whereby the throttle valve opening $\theta_{TH}$ increases from a point A indicating 0% to a point B, the operating state of the engine 10 enters the knocking prevention region ZK, and the knocking prevention device 104 performs the control for delaying the ignition timing.

In next step S5, it is determined whether or not the knocking prevention control performed by the knocking prevention device 104 has been finished. When the knocking prevention control has been finished, the lock-up engagement device 122 is permitted to engage the lock-up clutch 26, and the lock-up clutch 26 is reengaged.

Thus, if the knocking prevention device 104 performs control for delaying ignition timing in the case where the electronic throttle valve 80 is opened by the accelerator operation and fuel supply to the engine 12 is restarted when the lock-up clutch 26 is engaged by the lock-up engagement device 122, after the fuel supply has been stopped by the fuel cut device 102, the engagement control performed by the lock-up engagement device 122 is stopped so as to disengage the lock-up clutch 26. Therefore, power is transmitted via fluid of the torque converter 14, which prevents a shock due to a change of the operating state of the engine from the engine brake state to the driving state. In other words, when the operating state of the engine is changed from the engine brake state to the driving state, the smoothing processing device 106 normally performs smoothing processing by performing the control for delaying the ignition timing. However, if the control for delaying the ignition timing is performed as the knocking prevention control, the smoothing processing is not appropriately performed, and a shock may occur due to fluctuation in the driving force. Therefore, a shock is prevented by disengaging the lock-up clutch 26.

Also, when the lock-up clutch 26 is disengaged in this manner, a change in the rotational speed of the engine 12 is permitted to a certain extent. Therefore, occurrence of knocking is suppressed by the change in the engine rotational speed.

Also, since there is also provided the knocking prevention device 104 which prevents knocking by performing the control for delaying the ignition timing, occurrence of knocking is effectively prevented. In addition, the lock-up restriction device 124 disengages the lock-up clutch 26 only while the knocking prevention device 104 performs the control for delaying the ignition timing, and reengages the lock-up clutch 26 after the knocking prevention device 104 finishes the control. Therefore, deterioration of fuel efficiency is minimized while preventing a shock at the time of acceleration such as tip-in acceleration.

The droning noise suppression device 126 in FIG. 3 temporarily stops engagement control performed by the lock-up engagement device 122 so as to disengage the lock-up clutch 26 in the case where the engine rotational speed NE increases and enters a preset droning noise occurrence region ZS when the lock-up clutch 26 is engaged by the lock-up engagement device 122, and causes the continuously variable transmission 18 to perform shifting such that the turbine rotational speed NT exits from the droning noise occurrence region ZS, and then reengages the lock-up clutch 26. The droning noise suppression device 126 performs signal processing according to a flowchart in FIG. 9 when the vehicle is running forward.

Figure 9:
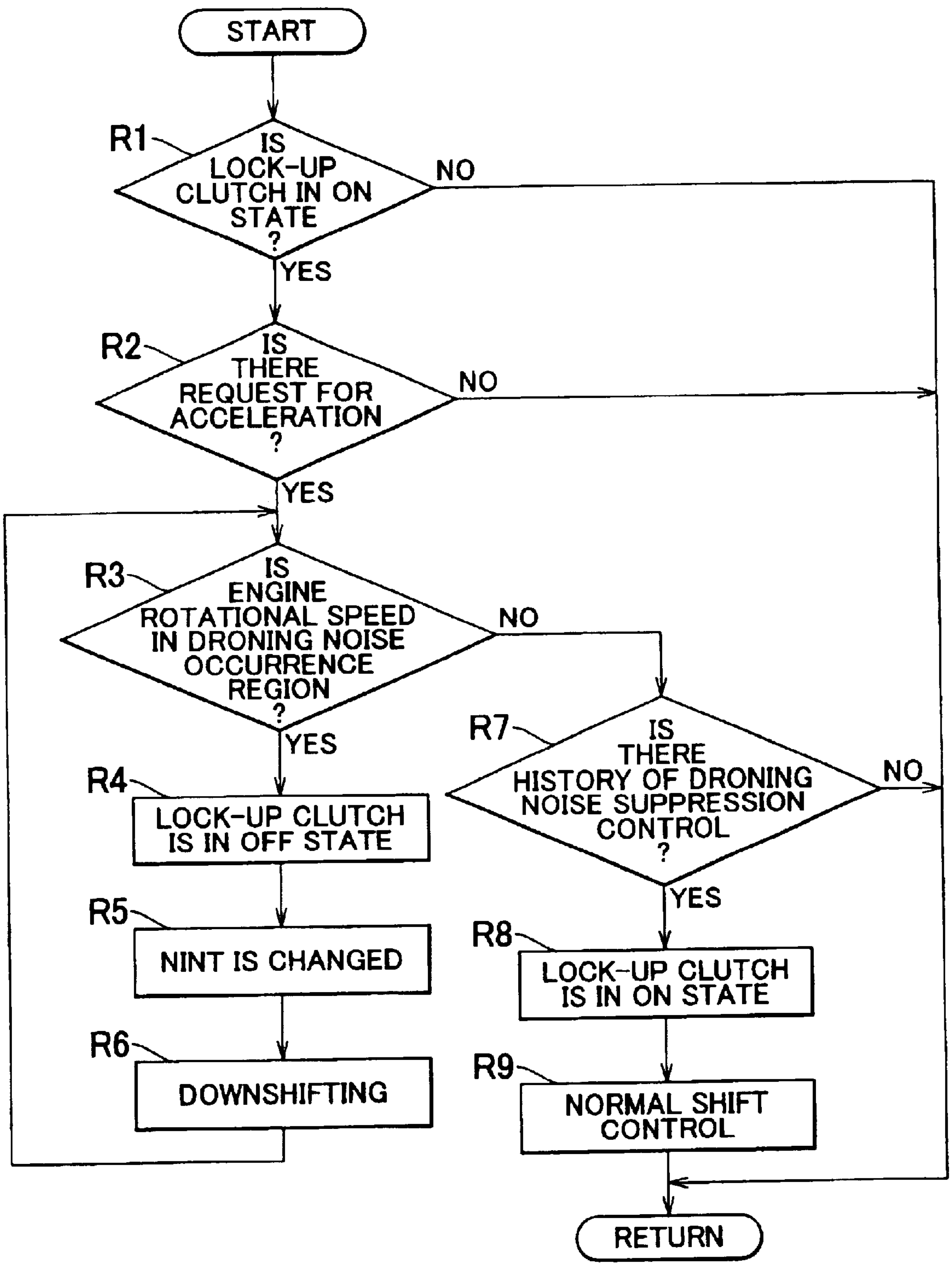
FIG. 9 is a flowchart specifically describing processing a droning noise suppression device shown in FIG. 8.

In step R1 in FIG. 9, it is determined whether or not the lock-up clutch 26 is engaged by the lock-up engagement device 122 (the lock-up clutch 26 is in the ON state). When the lock-up clutch 26 is in the ON state, step R2 is performed. In step R2, it is determined whether or not the throttle valve opening $\theta_{TH}$ is increased according to the accelerator operation. An affirmative determination is made also when the accelerator is operated (the accelerator is turned ON) after fuel supply has been stopped, whereby fuel supply is restarted and the electronic throttle valve 80 is controlled to be opened. When such a request for acceleration, step R3 and subsequent steps are performed.

In step R3, it is determined whether or not the turbine rotational speed NT which matches the engine rotational speed NE is in the preset droning noise occurrence region ZS. A droning noise occurs in a certain engine rotational speed region due to resonance between vibration of a driving system including the engine 12 and a vehicle body. The droning noise occurrence region ZS is preset through experiments or the like, for example, to be a low engine rotational speed region (e.g., in the vicinity of 1000 rpm). When the turbine rotational speed NT is in the droning noise occurrence region ZS, step R4 and subsequent steps are performed. In step R4, engagement control for the lock-up clutch 26 performed by the lock-up engagement device 122 is stopped so as to disengage the lock-up clutch 26. When the lock-up clutch 26 is disengaged, the engine and the driving system that are sources of vibration are separated, which reduces a droning noise. In addition, the engine rotational speed NE quickly increases and exits from the droning noise occurrence region ZS, which quickly prevents occurrence of the droning noise itself.

Figure 10:
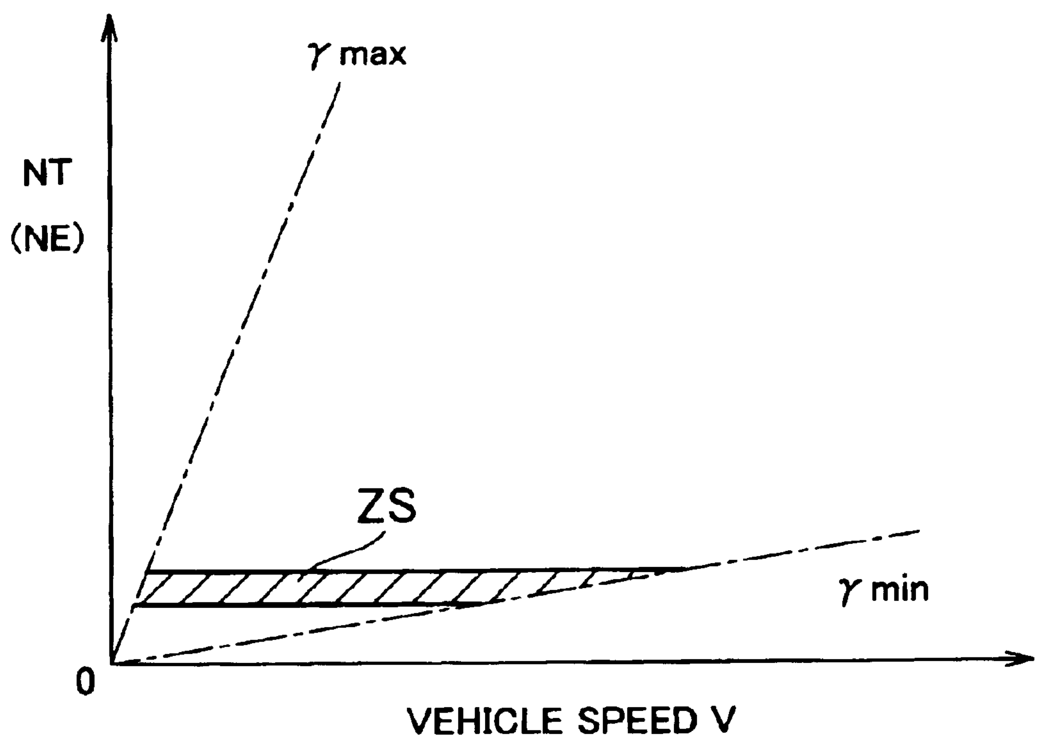
FIG. 10 is a diagram specifically describing a droning noise occurrence region ZS concerning step R3 in FIG. 9.

In step R5, the target rotational speed NINT is changed such that the turbine rotational speed NT (the input shaft rotational speed NIN) exits from the droning noise occurrence region ZS toward a higher rotation side. In step R6, the changed target rotational speed NINT is output to the shifting device 112, which causes the shifting device 112 to perform downshifting in preference to shifting according to the normal shift map in FIG. 4. When the target rotational speed NINT is changed in step R5, the turbine rotational speed NT which exits from the droning noise occurrence region ZS may be calculated according to the vehicle speed V based on, for example, a map in FIG. 10. Alternatively, the target rotational speed NINT may be increased by a certain amount or a certain percentage.

Subsequently, step R3 is repeated. After the turbine rotational speed NT exits from the droning noise occurrence region ZS and a negative determination (NO) is made in step R3, step R7 is performed. In step R7, it is determined whether there is a history of the droning noise suppression control, i.e., steps R4 to R6, have been performed. When there is no history of the droning noise suppression control, the process is terminated. When there is the history of the droning noise suppression control, the lock-up engagement device 122 is permitted to engage the lock-up clutch 26, and the lock-up clutch 26 is reengaged in step R8. Also, in step R9, outputting of the target rotational speed NINT to the shifting device 112 is stopped, and the control is returned to the normal shift control based on the shift map in FIG. 4.

Thus, in the case where the engine rotational speed NE increases and enters the droning noise occurrence region ZS when the lock-up clutch 26 is engaged by the lock-up engagement device 122, engagement control performed by the lock-up engagement device 122 is temporarily stopped so as to disengage the lock-up clutch 26. Therefore, the engine 12 and the driving system that are sources of vibration are mechanically separated, which reduces a droning noise. In addition, since a change in the engine rotational speed NE is permitted, the engine rotational speed quickly increases and exits from the droning noise occurrence region ZS, which quickly prevents occurrence of a droning noise. When the droning noise occurrence region ZS is set so as to be larger than a region in which a droning noise actually occurs, actual occurrence of a droning noise can be avoided.

Also, in addition to disengagement of the lock-up clutch 26, the continuously variable transmission 18 is caused to perform downshifting so that the turbine rotational speed NT exits from the droning noise occurrence region ZS, and then the lock-up clutch 26 is reengaged. Therefore, it is possible to set the lock-up clutch engagement region and the shift map (the shift condition) without considering a droning noise. Accordingly, it is possible to enlarge the lock-up clutch engagement region so as to further improve fuel efficiency. In addition, it is possible to improve fuel efficiency and running performance using appropriate shift control.

In other words, the droning noise suppression control is effective when the engine rotational speed NE transitionally enters the droning noise occurrence region ZS due to the accelerator operation or the like. The engine rotational speed NE may constantly remain in the droning noise occurrence region ZS according to the normal shift condition (the shift map). More specifically, when shifting is performed by the droning noise suppression device 126, and then the control is returned to the normal shift control in step R9, the engine rotational speed NE may reenter the droning noise occurrence region ZS. In such a case, for example, downshifting in steps R5, R6 may be stopped, and the lock-up clutch 26 may be maintained in the disengaged state. In the lock-up map in FIG. 6, a dotted line indicates a case where the lock-up clutch disengagement region is set such that the lock-up clutch 26 is disengaged even when the engine rotational speed transitionally enters the droning noise occurrence region. In this case, the lock-up clutch 26 is disengaged even when unnecessary, which is not preferable in terms of fuel efficiency. However, in the embodiment, the lock-up clutch engagement region is enlarged toward the low vehicle speed side, and the lock-up clutch 26 is disengaged only when the engine rotational speed NE enters the droning noise occurrence region ZS.

The drive control apparatus for a vehicle according to the embodiment of the invention includes the engine as a source of the driving force for running. However, the invention can be applied to a drive control apparatus for a hybrid vehicle, which includes another source of the driving force such as an electric motor, in addition to the engine. The engine is configured so as to include a fuel injection device or the like which can automatically stop fuel supply, for example, by a fuel cut device.

According to the embodiment, as the hydrodynamic power transmission device, a torque converter which has a function of amplifying torque is suitably employed. However, another hydrodynamic power transmission device such as a hydraulic coupling may be employed. The lock-up clutch directly couples an input side and an output side of the hydrodynamic power transmission device. As the lock-up clutch, a hydraulic frictional engagement device which is frictionally engaged by differential pressure of fluid of the hydrodynamic power transmission device, is suitably employed. However, various configurations can be employed, such as a configuration in which an electromagnetic frictional engagement device or the like is arranged in parallel with the hydrodynamic power transmission device.

Also, according to the embodiment, the lock-up engagement device perfectly engages the lock-up clutch. However, the lock-up engagement device may slip-engage the lock-up clutch by performing feedback control of engagement torque or the like such that a slip amount becomes equal to a predetermined target slip amount. The lock-up engagement condition is set using, as parameters, the accelerator operation amount (the throttle valve opening), the vehicle speed, and the like, which indicate the operating state.

Also, according to the embodiment, the drive control for a vehicle includes the fuel cut device, and the fuel cut device stops fuel supply when the vehicle is coasting with the throttle valve being fully closed. In addition, if there is a possibility that knocking will occur in the engine in the case where the throttle valve is opened due to the accelerator operation or the like, and fuel supply to the engine is restarted so as to increase the engine output when the lock-up clutch is engaged, after the fuel supply has been stopped, the lock-up clutch is disengaged. However, the lock-up clutch may be disengaged at times other than when the engine output is increased after the vehicle has been coasting and fuel supply has been stopped. The lock-up clutch may be disengaged at the time of sudden acceleration when the accelerator operation amount is large, though a shock is likely to occur particularly at the time of tip-in acceleration when the vehicle is gradually accelerated. The invention is applied to a case where the throttle valve is controlled to be opened by auto cruise control or the like, irrespective of the driver's accelerator operation.

According to the embodiment, the fuel cut condition is set so as to include a condition that the engine rotational speed is equal to or higher than a predetermined value, a condition that the engine coolant temperature is equal to or higher than a predetermined value, or the like so that the engine 12 can be started (i.e., the crankshaft can rotate independently) immediately when fuel supply is restarted.

According to the embodiment, the drive control apparatus for a vehicle includes the smoothing processing device which smooths a change in the driving force so as to reduce a shock by performing control for delaying the timing of ignition performed by the ignition device 84, at the time of acceleration when the operating state of the engine is changed from the engine brake state to the driving state, for example, at the time of tip-in acceleration after the vehicle has been coasting with the throttle valve being substantially fully closed.

According to the embodiment, the knocking prevention region is set using, for example, the engine rotational speed and the throttle valve opening as parameters. In general, when the engine rotational speed is relatively low, and the throttle valve opening is intermediate opening to high opening, knocking is likely to occur. The knocking prevention device is configured so as to prevent knocking, for example, by performing the control for delaying the ignition timing. The knocking prevention device is not necessarily essential in the embodiment, because a change in the engine rotational speed is permitted by disengagement of the lock-up clutch, which suppresses occurrence of knocking.

According to the embodiment, as the automatic transmission, for example, a belt type continuously variable transmission which can continuously change a gear ratio is suitably employed. However, it is possible to employ a stepped transmission, such as a planetary gear type transmission in which plural forward shift stages are achieved according to engagement and disengagement states of plural frictional engagement devices, or a two-shaft meshing type transmission in which plural forward shift stages are achieved by moving a clutch hub sleeve.

The droning noise occurrence region is appropriately preset through experiments or the like, according to the number of cylinders in the engine, the vehicle body type, and the like, so as to be a region in which the engine rotational speed is low, for example, approximately 1000 rpm. When a droning noise occurs in plural rotational speed regions, the plural regions can be set as the droning noise occurrence regions.

In the case where the engine output is increased by the accelerator operation or the like when the lock-up clutch is engaged, for example, in the case where acceleration is performed after the vehicle has been coasting with the accelerator being OFF, the droning noise suppression device performs shifting such that the engine rotational speed exits from the droning noise occurrence region. In such a case, it is preferable that the droning noise suppression device should perform downshifting in order to satisfy the driver's request for acceleration. However, the invention can be applied irrespective of an increase or a decrease in the engine output. Also, various modes can be employed, such as a mode in which the engine rotational speed exits from the droning noise occurrence region due to upshifting. The drive control apparatus for a vehicle includes the engine as a source of the driving force for running. However, the invention can be applied to a drive control apparatus for a hybrid vehicle, which includes another source of the driving force such as an electric motor, in addition to the engine. The engine is configured so as to include a fuel injection device which can automatically stop fuel supply, for example, by using the fuel cut device.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A drive control apparatus for a vehicle, comprising:

an engine which generates power using combustion of fuel;

a hydrodynamic power transmission which transmits an output of the engine via fluid, and which has an input side and an output side which can be directly coupled using a lock-up clutch;

a lock-up engagement device configured to engage the lock-up clutch when a predetermined lock-up engagement condition is satisfied;

a lock-up restriction device configured to stop engagement control performed by the lock-up engagement device so as to disengage the lock-up clutch if there is a possibility that knocking will occur in the engine when the lock-up clutch is engaged by the lock-up engagement device; and a knocking prevention device configured to control the engine so as to suppress occurrence of knocking when an operating state of the engine is in a preset knocking prevention region, wherein the lock-up restriction device configured to disengage the lock-up clutch only while the knocking prevention device performs control of the engine so as to suppress the occurrence of knocking, and to reengage the lock-up clutch after the control performed by the knocking prevention device is finished.

2. A drive control apparatus for a vehicle, comprising:

an engine which generates power using combustion of fuel;

a hydrodynamic power transmission which transmits an output of the engine via fluid, and which has an input side and an output side which can be directly coupled using a lock-up clutch;

a lock-up engagement device configured to engage the lock-up clutch when a predetermined lock-up engagement condition is satisfied; and a lock-up restriction device configured to stop engagement control performed by the lock-up engagement device so as to disengage the lock-up clutch if there is a possibility that knocking will occur in the engine when the lock-up clutch is engaged by the lock-up engagement device, further comprising:

fuel cut device configured to stop fuel supply to the engine when the vehicle is coasting with a throttle valve being fully closed, and a predetermined fuel cut condition is satisfied, wherein the lock-up restriction device is configured to stop the engagement control performed by the lock-up engagement device so as to disengage the lock-up clutch if there is a possibility that knocking will occur in the engine in a case where a throttle valve is opened and fuel supply to the engine is restarted when the lock-up clutch is engaged by the lock-up engagement device, after the fuel supply has been stopped by the fuel cut device.

3. A drive control apparatus for a vehicle, comprising:

an engine which generates power using combustion of fuel;

a hydrodynamic power transmission which transmits an output of the engine via fluid, and which has an input side and an output side which can be directly coupled using a lock-up clutch;

a lock-up engagement device configured to engage the lock-up clutch when a predetermined lock-up engagement condition is satisfied; and a lock-up restriction device configured to stop engagement control performed by the lock-up engagement device so as to disengage the lock-up clutch if there is a possibility that knocking will occur in the engine when the lock-up clutch is engaged by the lock-up engagement device, further comprising:

fuel cut device configured to stop fuel supply to the engine when the vehicle is coasting with a throttle valve being fully closed, and a predetermined fuel cut condition is satisfied, wherein the lock-up restriction device is configured to stop the engagement control performed by the lock-up engagement device so as to disengage the lock-up clutch if there is a possibility that knocking will occur in the engine in a case where a throttle valve is opened and fuel supply to the engine is restarted when the lock-up clutch is engaged by the lock-up engagement device, after the fuel supply has been stopped by the fuel cut device, further comprising:

a knocking prevention device configured to control the engine so as to suppress occurrence of knocking when an operating state of the engine is in a preset knocking prevention region, wherein the lock-up restriction device configured to disengage the lock-up clutch only while the knocking prevention device performs control of the engine so as to suppress the occurrence of knocking, and to reengage the lock-up clutch after the control performed by the knocking prevention device is finished.

4. A drive control apparatus for a vehicle, comprising:

an engine which generates power using combustion of fuel;

an automatic transmission which can automatically change a gear ratio;

a hydrodynamic power transmission device which transmits an output of the engine to the automatic transmission via fluid, and which has an input side and an output side which can be directly coupled;

a lock-up engagement device configured to engage the lock-up clutch when a predetermined lock-up engagement condition is satisfied; and a droning noise suppression device configured to temporarily stop engagement control performed by the lock-up engagement device so as to disengage the lock-up clutch in a case where an engine rotational speed enters a preset droning noise occurrence region when the lock-up clutch is engaged by the lock-up engagement device, and to cause the automatic transmission to perform shifting such that the engine rotational speed exits from the droning noise occurrence region when the lock-up clutch is reengaged, and then to reengage the lock-up clutch.

5. The drive control apparatus for a vehicle according to claim 4, further comprising:

a lock-up restriction device configured to stop the engagement control performed by the lock-up engagement device so as to disengage the lock-up clutch if there is a possibility that knocking will occur in the engine when the lock-up clutch is engaged by the lock-up engagement device.

6. A control method of a drive control apparatus for a vehicle, which comprises:

an engine which generates power using combustion of fuel;

a hydrodynamic power transmission which transmits an output of the engine via fluid, and in which an input side and an output side can be directly coupled using a lock-up clutch;

a lock-up engagement device which engages the lock-up clutch when a predetermined lock-up engagement condition is satisfied, comprising the step of:

stopping engagement control performed by the lock-up engagement device so as to disengage the lock-up clutch if there is a possibility that knocking will occur in the engine when the lock-up clutch is engaged by the lock-up engagement device; and disengaging the lock-up clutch only while the engine is controlled so as to suppress occurrence of knocking; and reengaging the lock-up clutch after the control performed by the knocking prevention device is finished.

7. A control method of a drive control apparatus for a vehicle, which comprises:

an engine which generates power using combustion of fuel;

a hydrodynamic power transmission which transmits an output of the engine via fluid, and in which an input side and an output side can be directly coupled using a lock-up clutch; and a lock-up engagement device which engages the lock-up clutch when a predetermined lock-up engagement condition is satisfied, comprising the step of:

stopping engagement control performed by the lock-up engagement device so as to disengage the lock-up clutch if there is a possibility that knocking will occur in the engine when the lock-up clutch is engaged by the lock-up engagement device, further comprising the step of:

stopping the engagement control performed by the lock-up engagement device so as to disengage the lock-up clutch if there is a possibility that knocking will occur in the engine in a case where a throttle valve is opened and fuel supply to the engine is restarted when the lock-up clutch is engaged by the lock-up engagement device, after the fuel supply has been stopped by the fuel cut device.

8. A control method of a drive control apparatus for a vehicle, which comprises:

an engine which generates power using combustion of fuel;

a hydrodynamic power transmission which transmits an output of the engine via fluid, and in which an input side and an output side can be directly coupled using a lock-up clutch; and a lock-up engagement device which engages the lock-up clutch when a predetermined lock-up engagement condition is satisfied, comprising the step of:

stopping engagement control performed by the lock-up engagement device so as to disengage the lock-up clutch if there is a possibility that knocking will occur in the engine when the lock-up clutch is engaged by the lock-up engagement device, further comprising the step of:

stopping the engagement control performed by the lock-up engagement device so as to disengage the lock-up clutch if there is a possibility that knocking will occur in the engine in a case where a throttle valve is opened and fuel supply to the engine is restarted when the lock-up clutch is engaged by the lock-up engagement device, after the fuel supply has been stopped by the fuel cut device, further comprising the following steps of:

performing control of the engine so as to suppress occurrence of knocking when an operating state of the engine is in a preset knocking prevention region;

disengaging the lock-up clutch only while the engine is controlled so as to suppress the occurrence of knocking; and reengaging the lock-up clutch after the engine control of suppressing the occurrence of knocking is finished.

9. A control method of a drive control apparatus for a vehicle, which comprises an engine which generates power using combustion of fuel;

an automatic transmission which can automatically change a gear ratio;

a hydrodynamic power transmission which transmits an output of the engine to the automatic transmission via fluid, and in which an input side and an output side can be directly coupled using a lock-up clutch; and a lock-up engagement device which engages the lock-up clutch when a predetermined lock-up engagement condition is satisfied, comprising the following steps of temporarily stopping engagement control performed by the lock-up engagement device so as to disengage the lock-up clutch in a case where an engine rotational speed enters a preset droning noise occurrence region when the lock-up clutch is engaged by the lock-up engagement device; and causing the automatic transmission to perform shifting so that the engine rotational speed exits from the droning noise occurrence region when the lock-up clutch is reengaged, and then reengaging the lock-up clutch.

10. The control method according to claim 9, further comprising the step of:

stopping the engagement control performed by the lock-up engagement device so as to disengage the lock-up clutch if there is a possibility that knocking will occur in the engine when the lock-up clutch is engaged by the lock-up engagement device.

* * * * *